(12) United States Patent
Zumsteg et al.

(10) Patent No.: US 8,311,548 B2
(45) Date of Patent: Nov. 13, 2012

(54) AUTOMATIC ASSOCIATION OF WIRELESS DEVICES TO POINT NAMES

(75) Inventors: Philip Zumsteg, Shorewood, MN (US); Patrick S. Gonia, Maplewood, MN (US)

(73) Assignee: Honeywell International Inc., Morristown, NJ (US)

( * ) Notice: Subject to any disclaimer, the term of this patent is extended or adjusted under 35 U.S.C. 154(b) by 210 days.

(21) Appl. No.: 12/730,335

(22) Filed: Mar. 24, 2010

(65) Prior Publication Data

US 2011/0237197 A1    Sep. 29, 2011

(51) Int. Cl.
*H04W 40/00*    (2009.01)
(52) U.S. Cl. ....................................................... 455/446
(58) Field of Classification Search ................... 455/446
See application file for complete search history.

(56) References Cited

U.S. PATENT DOCUMENTS

| | | |
|---|---|---|
| 2005/0152283 A1 | 7/2005 | Ritzenthaler |
| 2005/0195757 A1 | 9/2005 | Kidder et al. |
| 2008/0309464 A1 | 12/2008 | Chihara |
| 2009/0075676 A1 | 3/2009 | Park et al. |
| 2009/0082034 A1 | 3/2009 | Gray et al. |
| 2010/0035546 A1* | 2/2010 | Simons et al. ............. 455/41.2 |

FOREIGN PATENT DOCUMENTS

WO    WO-2008/029326 A2    3/2008

OTHER PUBLICATIONS

"Great Britain Application Serial No. 1103584.7, Combined Search and Examination Report mailed Jun. 28, 2011", 6 pgs.
"United Kingdom Application Serial No. 1103584.7, Response filed Nov. 9, 2011 to Office Action mailed Jun. 28, 2011", 17 pgs.
"Great Britain Application Serial No. 1103584.7, Office Action mailed Jan. 6, 2012", 2 pgs.
"British Application Serial No. 1103584.7, Response filed Mar. 30, 2012 to Office Action mailed Jan. 6, 2012", 9 pgs.

* cited by examiner

*Primary Examiner* — Lewis West
(74) *Attorney, Agent, or Firm* — Schwegman, Lundberg & Woessner, P.A.

(57) ABSTRACT

A system and method automatically associate wireless devices to point names. An installation plan indicates that wireless devices are installed at designated locations. Each designated location in the installation plan includes an associated point name, each wireless device is configured to transmit a message indicating itself as the source of the message, and each wireless communication device is installed proximate to its designated location. Expected distances are determined between one or more pairs of designated locations on the installation plan. Range estimate data is gathered from the installed wireless devices for one or more pairs of the installed wireless devices. A unique identifier within a signal transmitted by one of the installed wireless devices is associated with a corresponding point name on the installation plan. The association is determined at least in part by the expected distances and the range estimate data.

18 Claims, 14 Drawing Sheets

| DESIGNATED LOCATION | EXPECTED DISTANCE FROM 310 |
|---|---|
| 312 | 320-1 |
| 314 | 320-2 |
| 316 | 320-3 |
| 318 | 320-4 |

| DESIGNATED LOCATION | APPARENT DISTANCE FROM 410 |
|---|---|
| 412 | 432 |
| 424 | 444-2 |
| 426 | 446-2 |
| 428 | 448-2 |

| RANGE ESTIMATE | RESPONDING SECOND WIRELESS COMMUNICATION DEVICE |
|---|---|
| 520 | NONE |
| 522 | 512, 514 |
| 524 | 512, 514, 516 |

| DESIGNATED LOCATION | APPARENT DISTANCE FROM 610 |
|---|---|
| 612 | 620-1 |
| 614 | 620-2 |
| 616 | 620-3 |
| 618 | 620-4 |

| CALCULATED RANGE ESTIMATE | RESPONDING SECOND WIRELESS COMMUNICATION DEVICE |
|---|---|
| 672-1 | 662 |
| 672-2 | 664 |
| 672-3 | 666 |

| DESIGNATED LOCATION | ASSOCIATED DESIGNATED LOCATION AND WIRELESS DEVICE |
|---|---|
| 610 | 660 |
| 612 | 662 |
| 614 | 664 |
| 616 | 666 |

| APPARENT DISTANCE FROM 710 | DESIGNATED LOCATION |
|---|---|
| 720-1 | 710 |
| 720-2 | 712 |
| 720-3 | 714 |
| 720-4 | 718 |

| RANGE ESTIMATE | RESPONDING SECOND WIRELESS COMMUNICATION DEVICE |
|---|---|
| 770-1 | 760 |
| 770-2 | 762 |
| 770-3 | 764 |
| 770-4 | 768 |

| DESIGNATED LOCATION | ASSOCIATED DESIGNATED LOCATION AND WIRELESS DEVICE |
|---|---|
| 710 | 760 |
| 712 | 762 |
| 714 | 764 |
| 718 | 768 |

```
                                    (B)
                                     │
                                     ▼                                  ┌─ 818
┌──────────────────────────────────────────────────────────────────────────┐
│  THE GATHERING OF THE RANGE ESTIMATE DATA INCLUDES SELECTING A FIRST WIRELESS COMMUNICATION │
│  DEVICE TO TRANSMIT A FIRST SIGNAL USING A SELECTED TRANSMIT POWER LEVEL, TRANSMITTING THE FIRST │
│  SIGNAL, SWITCHING THE FIRST WIRELESS COMMUNICATION DEVICE TO A RECEIVE MODE, RECEIVING THE │
│  TRANSMITTED SIGNAL AT ONE OR MORE SECOND WIRELESS COMMUNICATION DEVICES, TRANSMITTING A SECOND │
│  SIGNAL FROM EACH OF THE ONE OR MORE SECOND WIRELESS COMMUNICATION DEVICES TO THE SELECTED FIRST │
│  WIRELESS COMMUNICATION DEVICE, RECEIVING ONE OR MORE OF THE SECOND SIGNALS AT THE SELECTED FIRST │
│  WIRELESS COMMUNICATION DEVICE, ESTIMATING A RANGE ASSOCIATED WITH THE SELECTED TRANSMIT POWER │
│  LEVEL AT WHICH ONE OF THE SECOND WIRELESS COMMUNICATION DEVICES COULD RECEIVE THE TRANSMITTED │
│  SIGNAL AT THE SELECTED TRANSMIT POWER LEVEL FROM THE SELECTED FIRST WIRELESS COMMUNICATION │
│  DEVICE, DETERMINING AN UPPER AND LOWER BOUND ON A RANGE BETWEEN THE FIRST WIRELESS │
│  COMMUNICATION DEVICE AND ONE OF THE SECOND WIRELESS COMMUNICATION DEVICES, INCORPORATING THE │
│  UPPER AND LOWER BOUND INTO THE RANGE ESTIMATE DATA, AND GENERATING A LIST OF UNIQUE IDENTIFIERS, │
│  ASSOCIATED WITH THE SELECTED TRANSMIT POWER LEVEL, COMPRISING SIGNALS RECEIVED BY THE FIRST │
│  WIRELESS COMMUNICATION DEVICE FROM THE ONE OR MORE SECOND WIRELESS COMMUNICATION DEVICES │
└──────────────────────────────────────────────────────────────────────────┘
                                     │                                  ┌─ 820
                                     ▼
┌──────────────────────────────────────────────────────────────────────────┐
│  THE UNIQUE IDENTIFIER OF THE FIRST WIRELESS COMMUNICATION DEVICE, SELECTED TRANSMIT │
│  POWER LEVEL, AND LIST OF UNIQUE IDENTIFIERS RECEIVED BY THE SELECTED FIRST WIRELESS │
│  COMMUNICATION DEVICE USING THE SELECTED TRANSMIT POWER LEVEL, ARE TRANSFERRED TO A │
│  DEVICE OTHER THAN THE FIRST WIRELESS COMMUNICATION DEVICE. THE DEVICE OTHER THAN THE FIRST │
│  WIRELESS COMMUNICATION DEVICE HAS ACCESS TO THE INSTALLATION PLAN, AND CAN THEN COMPUTE │
│  THE ASSOCIATIONS BETWEEN THE DEVICES AND THE POINT NAMES │
└──────────────────────────────────────────────────────────────────────────┘
                                     │                                  ┌─ 822
                                     ▼
┌──────────────────────────────────────────────────────────────────────────┐
│  THE SELECTED TRANSMIT POWER LEVEL IS INITIALLY SET TO EITHER A LOWEST POSSIBLE LEVEL, │
│  A HIGHEST POSSIBLE LEVEL, OR AN INTERMEDIATE LEVEL │
└──────────────────────────────────────────────────────────────────────────┘
                                     │                                  ┌─ 824
                                     ▼
┌──────────────────────────────────────────────────────────────────────────┐
│  THE SELECTED TRANSMIT POWER LEVEL IS INCREASED TO AT LEAST ONE LEVEL GREATER THAN A LEVEL │
│  NECESSARY TO RECEIVE A RESPONSE FROM AT LEAST ONE OF THE SECOND WIRELESS COMMUNICATION DEVICES │
│  OR THE SELECTED TRANSMIT POWER LEVEL IS DECREASED TO AT LEAST ONE LEVEL LOWER THAN A LEVEL │
│  NECESSARY TO RECEIVE A RESPONSE FROM AT LEAST ONE OF THE SECOND WIRELESS COMMUNICATION DEVICES │
└──────────────────────────────────────────────────────────────────────────┘
                                     │                                  ┌─ 826
                                     ▼
┌──────────────────────────────────────────────────────────────────────────┐
│  AN UPPER AND LOWER BOUND ON A RANGE BETWEEN THE FIRST WIRELESS COMMUNICATION │
│  DEVICE AND ONE OF THE SECOND WIRELESS COMMUNICATION DEVICES IS DETERMINED │
└──────────────────────────────────────────────────────────────────────────┘
                                     │                                  ┌─ 828
                                     ▼
┌──────────────────────────────────────────────────────────────────────────┐
│  THE UPPER AND LOWER BOUND IS INCORPORATED INTO THE RANGE ESTIMATE DATA │
└──────────────────────────────────────────────────────────────────────────┘
                                     │                                  ┌─ 830
                                     ▼
┌──────────────────────────────────────────────────────────────────────────┐
│  THE GATHERING OF THE RANGE ESTIMATE DATA INCLUDES DETERMINING, BY A FIRST WIRELESS │
│  COMMUNICATIONS DEVICE, LINK ATTENUATION VALUES BASED ON A KNOWN TRANSMIT POWER LEVEL │
│  AND A RECEIVED SIGNAL STRENGTH INDICATION (RSSI) THAT IS DERIVED FROM SIGNALS OCCASIONALLY │
│  TRANSMITTED BY THE ONE OR MORE SECOND WIRELESS COMMUNICATIONS DEVICES │
└──────────────────────────────────────────────────────────────────────────┘
                                     │                                  ┌─ 832
                                     ▼
┌──────────────────────────────────────────────────────────────────────────┐
│  THE LINK ATTENUATION VALUES ARE USED TO DETERMINE A RANGE ESTIMATE BETWEEN A RECEIVING FIRST │
│  WIRELESS COMMUNICATIONS DEVICE AND A TRANSMITTING SECOND WIRELESS COMMUNICATIONS DEVICE │
└──────────────────────────────────────────────────────────────────────────┘
                                     │
                                     ▼
                                    (C)
```

AUTOMATIC ASSOCIATION OF WIRELESS DEVICES TO POINT NAMES

TECHNICAL FIELD

The present disclosure relates to the installation of wireless devices, and in an embodiment, but not by way of limitation, the automatic association of wireless devices to point names in an installation plan.

BACKGROUND

Applications, such as building HVAC control, may utilize one or more wireless devices for the purposes of sensing, control, and actuation. Each wireless device is installed at a location referenced by a unique human-readable point name (used to reference the location-specific function of the wireless device) as indicated on an installation plan (e.g., a blueprint). Each device further uses a unique ID (e.g., MAC ID) to identify the device during wireless communications. Applications (e.g., HVAC control) depend on a mapping between unique device IDs and point names for correct operation.

Various manual techniques exist for performing the necessary mapping such as manually pre-configuring each wireless device and assigning point names prior to installation, or using peel-off labels (containing the unique ID) to place on the installation plan for subsequent manual association with point names. Both approaches are labor-intensive and subject to human error.

Exacerbating the problem is the fact that many such HVAC wireless devices require scaffolding and/or ladders for physical access. Further, the devices are typically unpowered at the time of installation making verification difficult.

BRIEF DESCRIPTION OF THE DRAWINGS

FIGS. 8A-8D are a flowchart of an example process of automatically associating wireless devices to point names.

DETAILED DESCRIPTION

Figure 1:
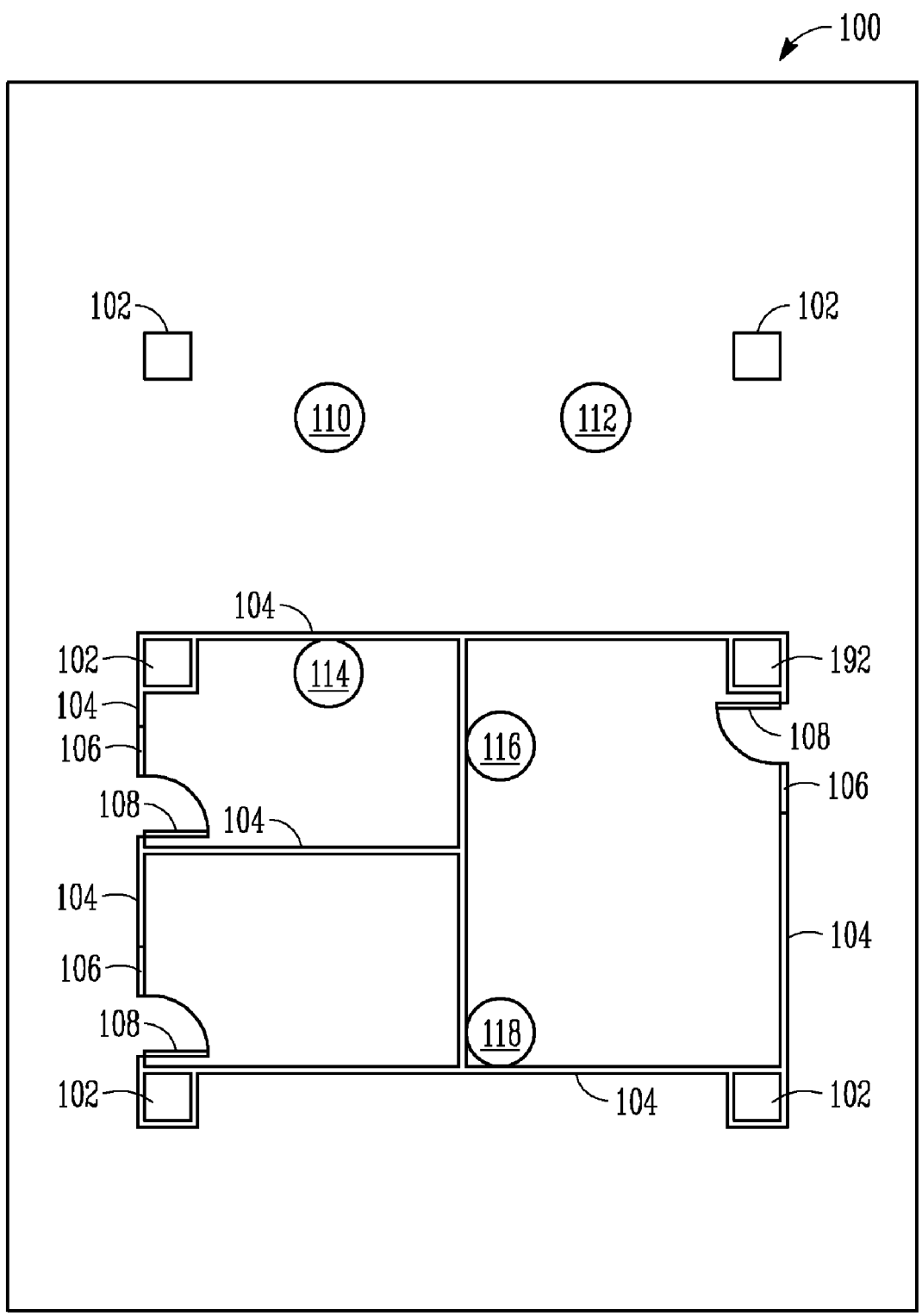
FIG. 1 is a schematic of an installation plan for a plurality of wireless communication devices.

Wireless devices exhibit a predictable RF propagation pattern, given knowledge of certain RF link parameters (transmitter power, path loss, receiver sensitivity, data rate, physical environment, antenna gain, etc.). Measuring the estimated range between pairs of devices and comparing that data to the expected range based on the site plan allows the point names on the site plan to be associated with installed or temporarily positioned wireless devices.

An embodiment utilizes automatic wireless device parameter control, installation plan information, and an inferencing engine to perform a process of identification, selection, mapping, and association of installed wireless devices with point names.

An embodiment coordinates one or more wireless devices, in order to create a predictable RF signal propagation scenario, which is then mapped onto the installation plan. Automatic analysis of detected communication links from the coordinated devices is used to infer which wireless device should be associated with a given point name on the installation plan.

An embodiment estimates a range using received signal strength indication (RSSI), a measure of link attenuation. Link attenuation provides estimates of range which are compared with possibilities on the plan to infer which wireless device should be associated with a given point name.

Another embodiment measures time-of-flight for range estimation.

One or more embodiments are effective with wireless (including RF, optical, acoustic, etc.) communications devices that are capable of (a) peer-peer communication or (b) programmatic control of transmit power including IEEE 802.11 a/b/g/n/ and IEEE 802.14.5.

One or more embodiments benefit from, but do not require, information provided in signals transmitted by a wireless device, including but not limited to, device type.

One or more embodiments benefit from, but do not require, information regarding the physical environment in which the wireless devices are operating (i.e., location of windows, walls, floors and types of building materials used).

One or more embodiments utilize a machine readable scaled installation plan, with the intended locations of each wireless device indicated and labeled with a point name. The computing platform hosting the installation plan uses communications, and in an embodiment wireless communications, with each of the devices for which association is desired. Additionally, other wireless devices not requiring association may also be accessed, provided their location(s) are marked on the installation plan.

In one embodiment, a wireless device is initially selected to transmit a signal, using a specific transmit power level. The initial transmit power level is typically the lowest possible transmit level, though optimization of the method is possible by selecting another initial transmit power level (and subsequent variations in transmit power level). After transmitting the signal, the selected wireless device enters the receive mode.

All other wireless devices are initially in the receive mode. If any of the wireless devices in receive mode successfully process the transmitted signal, each such device responds by transmitting a signal back to the initially selected wireless device, with the signal including the unique ID of the responding wireless device.

The initially selected wireless device creates a list of unique ID values obtained from all responding devices for the current transmit power level.

The initially selected wireless device then changes the transmit power level (nominally in a monotonically increasing sequence) and repeats the above request/response sequence. With a higher transmit power level, the signal will propagate a greater distance, and perhaps enable additional wireless devices to respond.

The initially selected wireless device adds a new list entry for the adjusted transmit power level and the unique ID values from all new responding wireless devices (the new list may include some unique ID values already in lists for other transmit power levels).

After the initially selected wireless device has completed the process of increasing the transmit power level in order to request additional wireless devices, the set of lists is transferred to another device containing the installation plan.

Using the scaled installation plan, and the estimated maximum distance for each transmit power level, locations of responding wireless devices relative to the initially selected wireless device may be used to map the set of lists to the points marked on the installation plan.

If the installation plan has points which are not yet associated, then another already-associated wireless device is selected to become the transmitting wireless device, and the above process is performed again, to incrementally add additional associations.

For an efficient operation of an embodiment, it is helpful to manually associate at least one wireless device and its point name to start the process. It is also beneficial to complete the process by manually associating wireless devices with any few remaining point names.

A flowchart illustrating an example embodiment of this process 800 is shown in FIGS. 8A-8D. FIGS. 8A-8D include a number of process blocks 802-854. Though arranged serially in the example of FIGS. 8A-8D, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 8A-8D, at 802, an installation plan for wireless communication devices installed at designated locations is received into a computer processor. Each designated location in the installation plan includes an associated point name, each wireless communication device is configured to transmit a message indicating itself as the source of the message, and each wireless communication device is installed proximate to its designated location. At 804, the computer processor determines expected distances between one or more pairs of designated locations on the installation plan. At 806, range estimate data is gathered into the computer processor from the installed wireless communication devices for one or more pairs of the installed wireless communication devices. At 808, the computer processor associates a unique identifier within a signal transmitted by one of the installed wireless communication devices with a corresponding point name on the installation plan. The association is determined at least in part by the expected distances and the range estimate data.

At 810, the reception of the installation plan into the computer processor includes receiving designated location information for all wireless communications devices to be installed. The reception further includes, for each designated location, receiving a set of coordinates describing the scaled location of the wireless communication device in the installation plan, and receiving a point name for the wireless communication device. In this embodiment, each designated location includes a set of coordinates, and the coordinates represent a known distance scale. At 812, the reception of the installation plan into the computer processor includes receiving a device type for each designated location.

At 814, the determination of the expected distance between a pair of designated locations includes computing a scaled expected distance using the set of coordinates in the installation plan for each of the designated locations, and computing the expected distance by applying the installation plan scale value to the scaled expected distance. At 816, the determination of the expected distance includes determining an apparent distance that adjusts the expected distance by considering effects, on signal propagation for a path between the designated locations, of one or more of building construction, building material, building architecture, signal frequency, transmit power level, antenna type, antenna orientation, and antenna proximity to the building material.

At 818, the gathering of the range estimate data includes selecting a first wireless communication device to transmit a first signal using a selected transmit power level, transmitting the first signal, switching the first wireless communication device to a receive mode, receiving the transmitted signal at one or more second wireless communication devices, transmitting a second signal from each of the one or more second wireless communication devices to the selected first wireless communication device, receiving one or more of the second signals at the selected first wireless communication device, estimating a range associated with the selected transmit power level at which one of the second wireless communication devices could receive the transmitted signal at the selected transmit power level from the selected first wireless communication device, determining an upper and lower bound on a range between the first wireless communication device and one of the second wireless communication devices, incorporating the upper and lower bound into the range estimate data, and generating a list of unique identifiers associated with the selected transmit power level, comprising signals received by the first wireless communication device from the one or more second wireless communication devices. At 820, the unique identifier of the first wireless communication device, selected transmit power level, and list of unique identifiers received by the selected first wireless communication device using the selected transmit power level, are transferred to a device other than the first wireless communication device. The device other than the first wireless communication device has access to the installation plan, and can then compute the associations between the devices and the point names. At 822, the selected transmit power level is initially set to either a lowest possible level, a highest possible level, or an intermediate level. At 824, the selected transmit power level is increased to at least one level greater than a level necessary to receive a response from at least one of the second wireless communication devices or the selected transmit power level is decreased to at least one level lower than a level necessary to receive a response from at least one of the second wireless communication devices. At 826, an upper and lower bound on a range between the first wireless communication device and one of the second wireless communication devices is determined, and at 828, the upper and lower bound is incorporated into the range estimate data.

At 830, the gathering of the range estimate data includes determining, by a first wireless communications device, link attenuation values based on a known transmit power level and a received signal strength indication (RSSI) that is derived from signals occasionally transmitted by the one or more second wireless communications devices. At 832, the link attenuation values are used to determine a range estimate between a receiving first wireless communications device and a transmitting second wireless communications device. At 834, the accuracy of the range estimate is improved by considering effects, on signal propagation for a path between a pair of wireless communication devices, of one or more of building construction, building material, building architecture, signal frequency, transmit power level, antenna type, antenna orientation, and antenna proximity to the building material. At 836, the unique identifiers of the transmitting and receiving wireless communication devices, known transmit power level, RSSI, and link attenuation values of the receiving wireless communication device, are transferred to a device other than the transmitting second wireless communications device and the receiving first wireless communications devices, and at 838, a device other than the transmitting second wireless communications device and the receiving first wireless communications device has access to the installation plan so that the device other than the transmitting second wireless device and the receiving first wireless communications device can associate the wireless communication devices.

At 840, the point name to be associated with a particular unique identifier is selected using information including the expected distances, apparent distances, transmit power levels, and the range estimates. At 842, the association of the point name to a particular unique identifier further includes comparing at least one of the one or more range estimates determined by a selected first wireless communications device with at least one of the one or more expected distances determined from the installation plan for the designated location of a selected first wireless communications device and one or more second wireless communication devices, and when a range estimate is less than or equal to an expected distance, adding the unique identifier for the range estimate to a list of unique identifiers for the expected distance for the selected first wireless communications device. At 844, the association of the point name to a particular unique identifier further includes ordering the set of expected distances for a selected first wireless communications device from shortest to longest expected distance, and starting with the shortest expected distance, examining the list of unique identifiers for this expected distance. Thereafter, one of three options are implemented. First, when there is only one unique identifier in the list, the unique identifier is assigned to the point name of the designated location of a second wireless communications device on the installation plan for which the expected distance from the first wireless communications device was determined. Second, when there is no unique identifier in the list, no association of wireless devices is performed. Third, when there are two or more unique identifiers in the list, a discrimination among the alternative choices associates each of the one or more second wireless communication devices with a point name on the installation plan based at least in part on previously associated unique identifiers and device type. At 846, the discriminating among the alternative choices for associating a unique identifier with a point name on the installation plan further includes discriminating among alternate choices based on consideration of unique identifiers that have not previously been associated with a point name. At 848, the discriminating among the alternative choices for associating a unique identifier with a point name on the installation plan further includes discriminating among the alternate choices based on a device type of each of the one or more second wireless communication devices, and transmitting a signal by at least one of the second wireless communication devices that includes a device type, and comparing the device type to a device type associated with a point name in the installation plan.

At 850, the association of the wireless communication devices is iterative, and each iteration uses previously established association data including established locations on the installation plan of previously associated point names. At 852, one or more wireless communication devices are temporarily placed at known locations for the purpose of providing additional range estimate data for one or more wireless devices whose associations with point names on the installation plan are uncertain. It is noted that the computer processor that is associating the wireless communication devices has information about the designated locations of the temporarily placed devices. At 854, the gathering of range estimate data includes using wireless communication devices for gathering measurements of a radio signal time of flight, an acoustic signal time of flight, or an optical signal time of flight between the one or more pairs of devices, and using the respective time-of-flight measurements to estimate a range between the pairs.

FIGS. 1-7 illustrate in diagrammatic form an example system and process to automatically associate wireless devices to point names. In an example embodiment, two or more wireless communication devices are installed proximate to designated locations. The two or more wireless communication devices are configured to include in one or more wireless transmitted signals an identifier uniquely identifying the wireless communication device that transmitted the signal. Such a system further includes one or more computer processors. The computer processors are configured to receive an installation plan for the two or more wireless communication devices. Each designated location in the installation plan includes an associated point name. The computer processors are further configured to determine expected distances between pairs of designated locations in the installation plan, gather range estimate data from the installed wireless communication devices for one or more pairs of the installed wireless communication devices, and associate a unique identifier with a corresponding point name on the installation plan. The association is determined at least in part by the expected distances and range estimate data.

The system and method of FIGS. 1-8 can further include one or more temporarily placed wireless communication devices at known locations. These temporarily placed devices serve the purpose of providing additional range estimate data for one or more wireless devices whose associations with point names on the installation plan are uncertain. In this embodiment, one or more computer processors of the system have information about the designated location of the temporarily placed devices.

Referring to FIGS. 1-7 in more detail, FIG. 1 is an example schematic of a scaled installation plan 100 for a plurality of wireless communication devices. The installation plan illustrates the features of the environment in which the wireless communication devices are placed, such as concrete support columns 102, interior walls 104, windows 106, and doors 108. The installation plan may further indicate the materials that the features are constructed of, such as safety glass for the windows and solid wood for the doors. The installation plan further illustrates the location of several wireless communication devices 110, 112, 114, 116, and 118, each of which may be installed or temporarily positioned.

Figure 2:
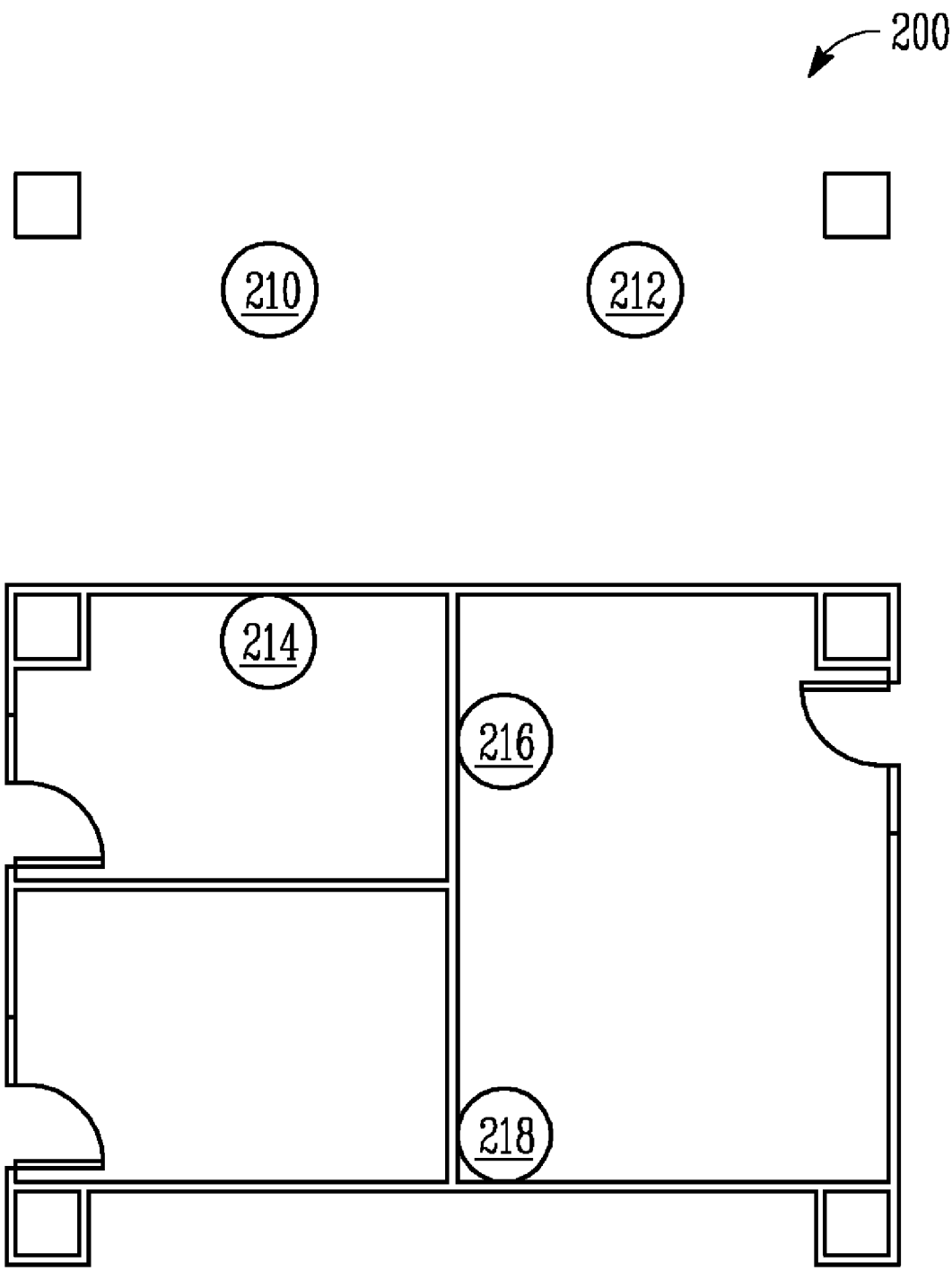
FIG. 2 is a plan view of several wireless communication devices installed or temporarily positioned at a location.

FIG. 2 is a plan view of several wireless communication devices as they are actually physically installed at a location 200. The devices 210, 212, 214, 216, and 218 are installed proximate to the locations are designated in the installation plan 100.

Figures 3A, 3B:
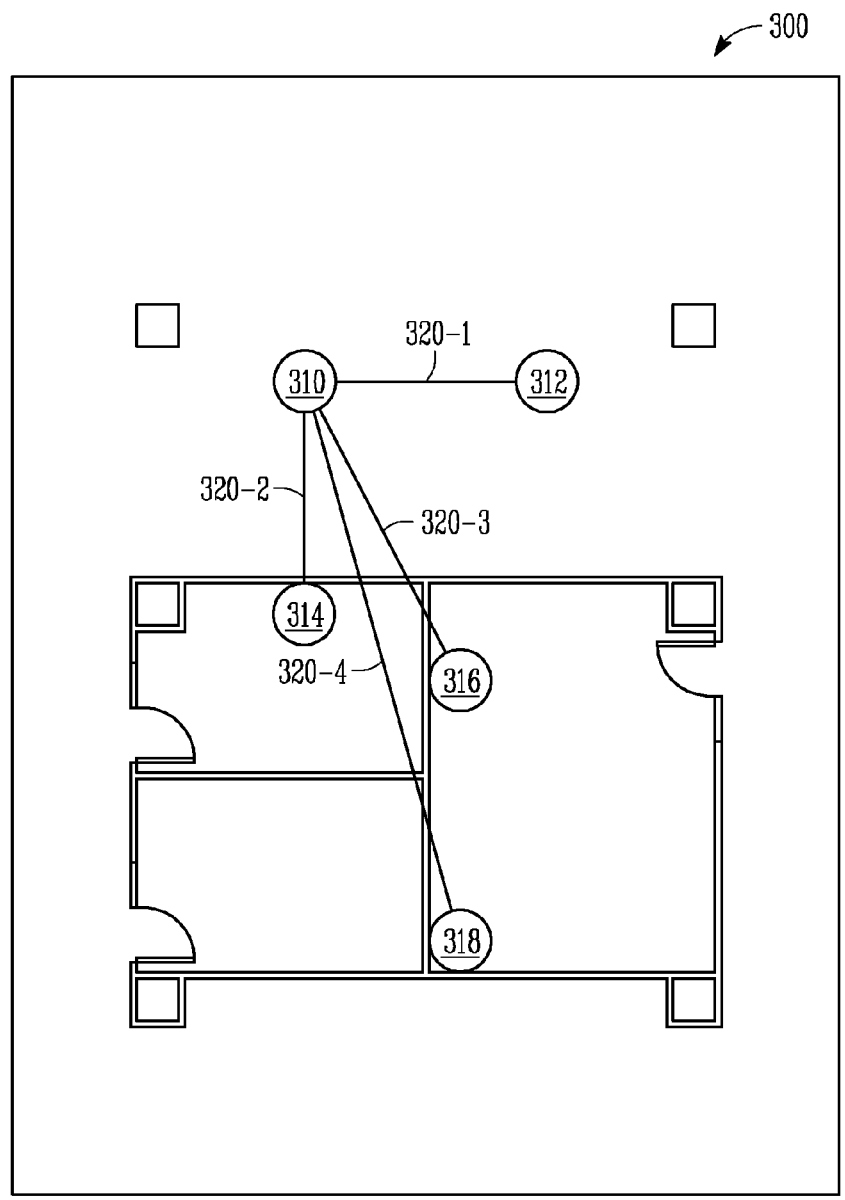
FIG. 3A illustrates expected distances from one wireless communication device to several other wireless communication devices.
FIG. 3B is a table of the expected distances from the one wireless communication device of FIG. 3A to the other wireless communication devices of FIG. 3A.

FIG. 3A is an illustration 300 of expected distances from one wireless communication device to several other wireless communication devices, and FIG. 3B is a table of the expected distances from the one wireless communication device of FIG. 3A to the other wireless communication devices of FIG. 3A. The expected distances 320-1, 320-2, 320-3, and 320-4 are calculated from the scaled installation plan 100.

Figures 4A, 4B:
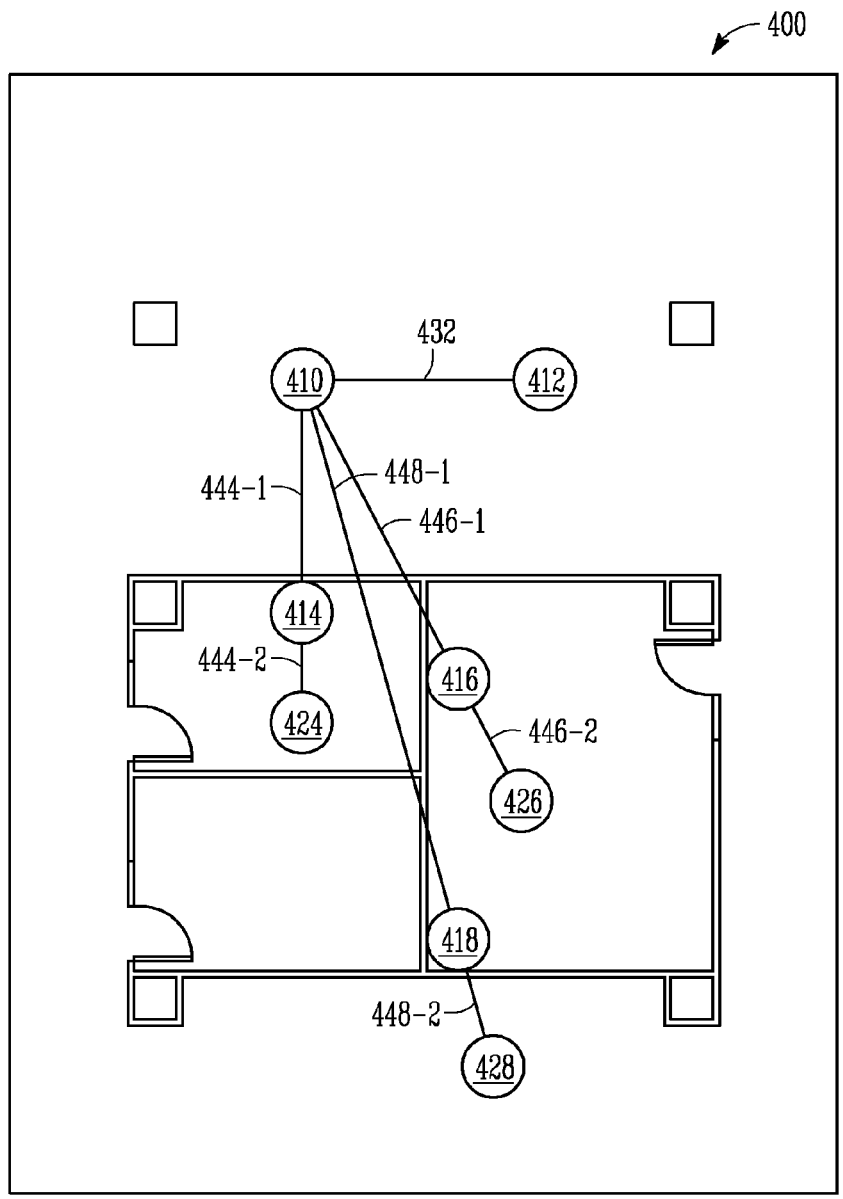
FIG. 4A illustrates an adjustment of the expected distances of FIG. 3A.
FIG. 4B is a table of the apparent distances from the one wireless communication device of FIG. 4A to the other wireless communication devices of FIG. 4A.

FIG. 4A is an illustration 400 of an adjustment of the expected distances of FIG. 3A. FIG. 4B is a table of the apparent distances from the one wireless communication device of FIG. 3A to the other wireless communication devices of FIG. 3A. Referring to 400 of FIG. 4A, a first wireless device 410 transmits a signal that is received by the other wireless communication devices 412, 414, 416, and 418. The expected distance 432 between devices 410 and 412 does require an adjustment because there are no building structures or other obstacles between device 410 and device 412. FIG. 4A further illustrates the expected distances 444-1, 446-1, and 448-1, and the apparent distances 444-2, 446-2, and 448-2, which represent an increase in the expected distance, caused by the attenuation of the signal as it passes through the building materials, and the resulting apparent locations 424, 426, and 428 of the other wireless communication devices.

Figures 5A, 5B:
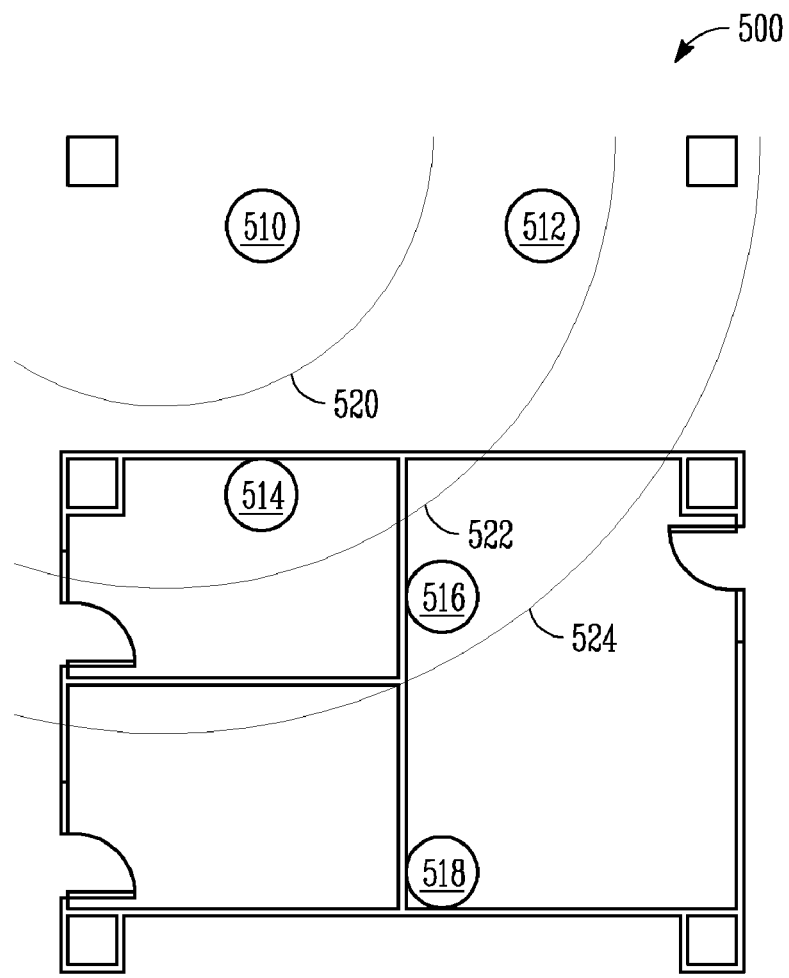
FIG. 5A illustrates the gathering of range estimate data from installed and temporarily positioned wireless devices.
FIG. 5B is a table of responding wireless communication devices for several range estimate distances.

FIG. 5A is an illustration 500 of a gathering of range estimate data from installed wireless devices. FIG. 5B is a table of responding wireless communication devices for several range estimate distances of FIG. 5A. In FIG. 5A, devices 510, 512, 514, 516, and 518 are installed wireless devices. Device 510 is first manually associated, then it transmits signals at several increasing power transmit levels, and then range estimate data is gathered based on those transmissions of increasing power level. As can be seen from FIG. 5A, device 510 transmits at power levels that result in ranges of 520, 522, and 524. As shown in FIG. 5B, no devices respond to the transmit power level that results in estimated range 520, devices 512 and 514 respond to the transmit power level that results in estimated range 522, and devices 512, 514, and 516 respond to the transmit power level that results in estimated range 524. It is noted that FIG. 5A is also applicable to a set up in which device 510 is gathering range estimates based on a received signal strength indication (RSSI). FIG. 5A can further be applied to signals transmitted or received by devices 512, 514, 516, and 518.

Figures 6A, 6B:
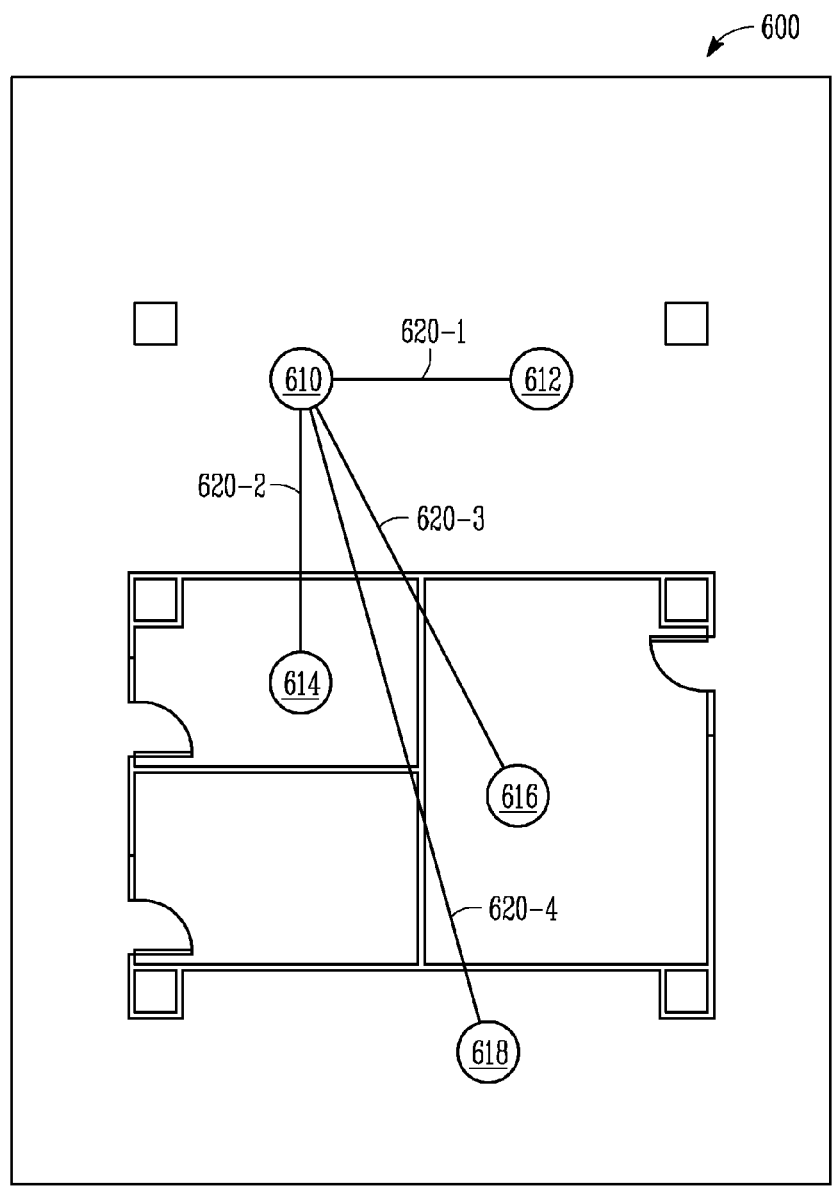
FIG. 6A illustrates apparent distances for several wireless communication devices.
FIG. 6B is a table of the apparent distances of FIG. 6A.
Figures 6C, 6D, 6E:
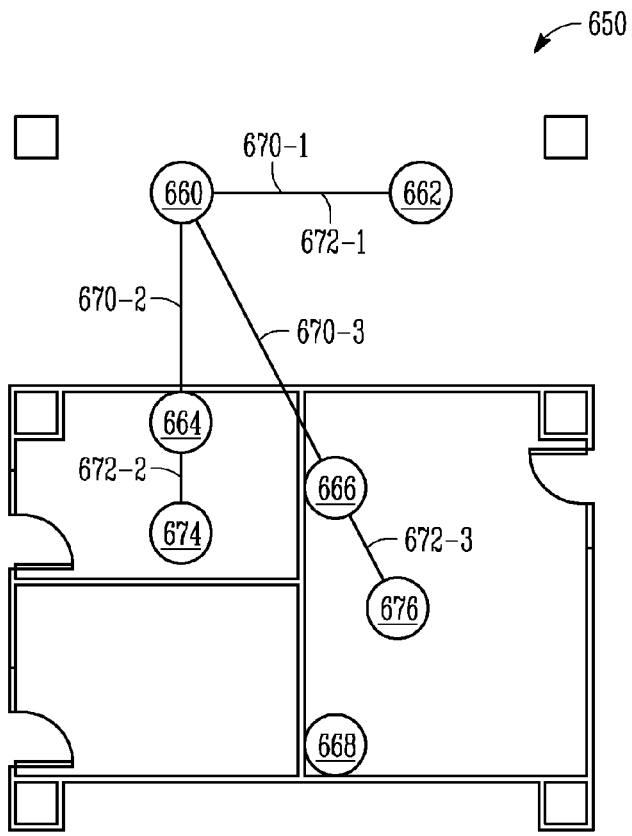
FIG. 6C illustrates range estimate data for selected wireless communication devices.
FIG. 6D is a table of the range estimate data of FIG. 6C.
FIG. 6E is a table of associations between designated location point names of FIG. 6A and the responding second wireless devices of FIG. 6C.

FIG. 6A illustrates apparent distances 620-1, 620-2, 620-3, and 620-4 for several wireless communication devices 610, 612, 614, 616, and 618. FIG. 6B is a table of the apparent distances of FIG. 6A. As noted previously, there is no change in the apparent distance for device 612, since there are no obstacles such as building structures between device 610 and device 612. The apparent distances 620-2, 620-3, and 620-4 are different than that which is indicated on the installation plan, since these signals are affected by building structures. Similarly, the calculated range estimates of FIG. 6D, which are illustrated in FIG. 6C, include the effects of building materials and structure on the signals. FIG. 6C illustrates the calculated range estimates 672-2 and 672-3 for devices 674 and 676 are greater than the distances 670-2 and 670-3 for the locations of devices 664 and 666 according to the installation plan. The calculated range estimate 672-1 for device 662 is similar to the distance 670-1 expected from the installation plan since there are no building materials in the signal path. It is noted from FIG. 6C that device 668 has not been associated yet. FIG. 6E is a table of designated locations of FIG. 6A and the responding locations of FIG. 6C, such that, for example, the apparent or designated location of device 614 (which was affected by the increased power transmit level required to penetrate the building walls) is actually found to be located at 664 as illustrated in FIG. 6C (per the calculated range estimates).

Figures 7A, 7B:
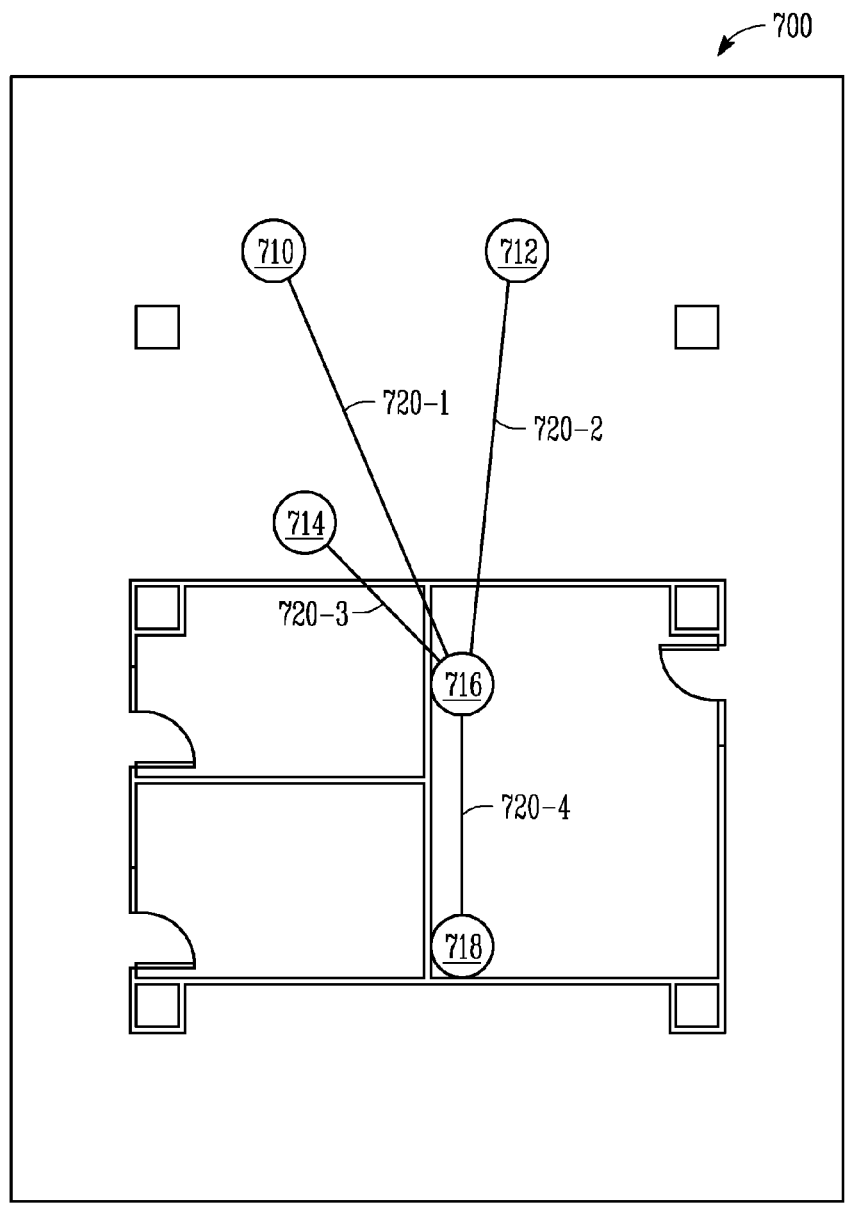
FIG. 7A illustrates apparent distances for several wireless communication devices as in FIG. 6A, but with a newly selected transmitting device.
FIG. 7B is a table of the apparent distances of FIG. 7A.
Figures 7C, 7D, 7E:
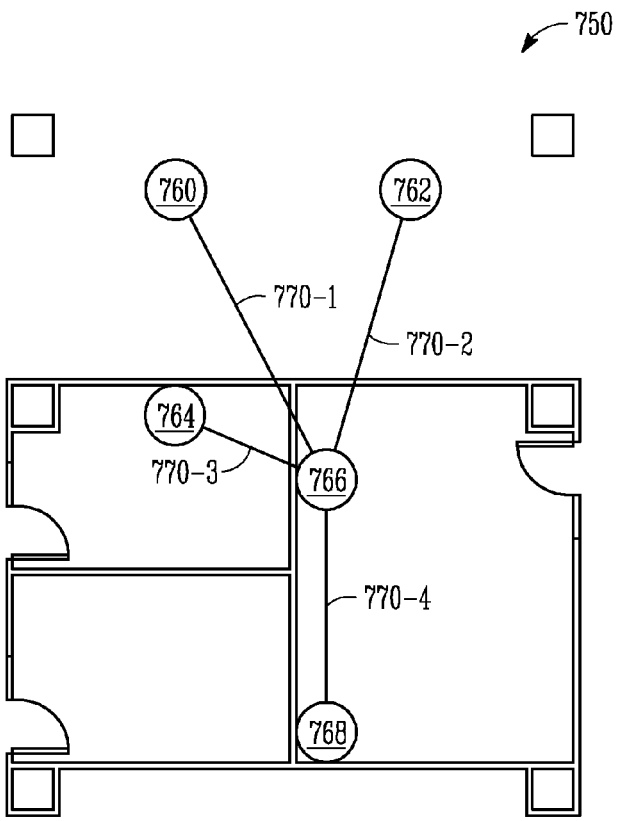
FIG. 7C illustrates range estimate data for selected wireless communication devices.
FIG. 7D is a table of the range estimate data of FIG. 7C.
FIG. 7E is a table of associations between designated locations of FIG. 7A and the responding locations of FIG. 7C.
Figure 8A:
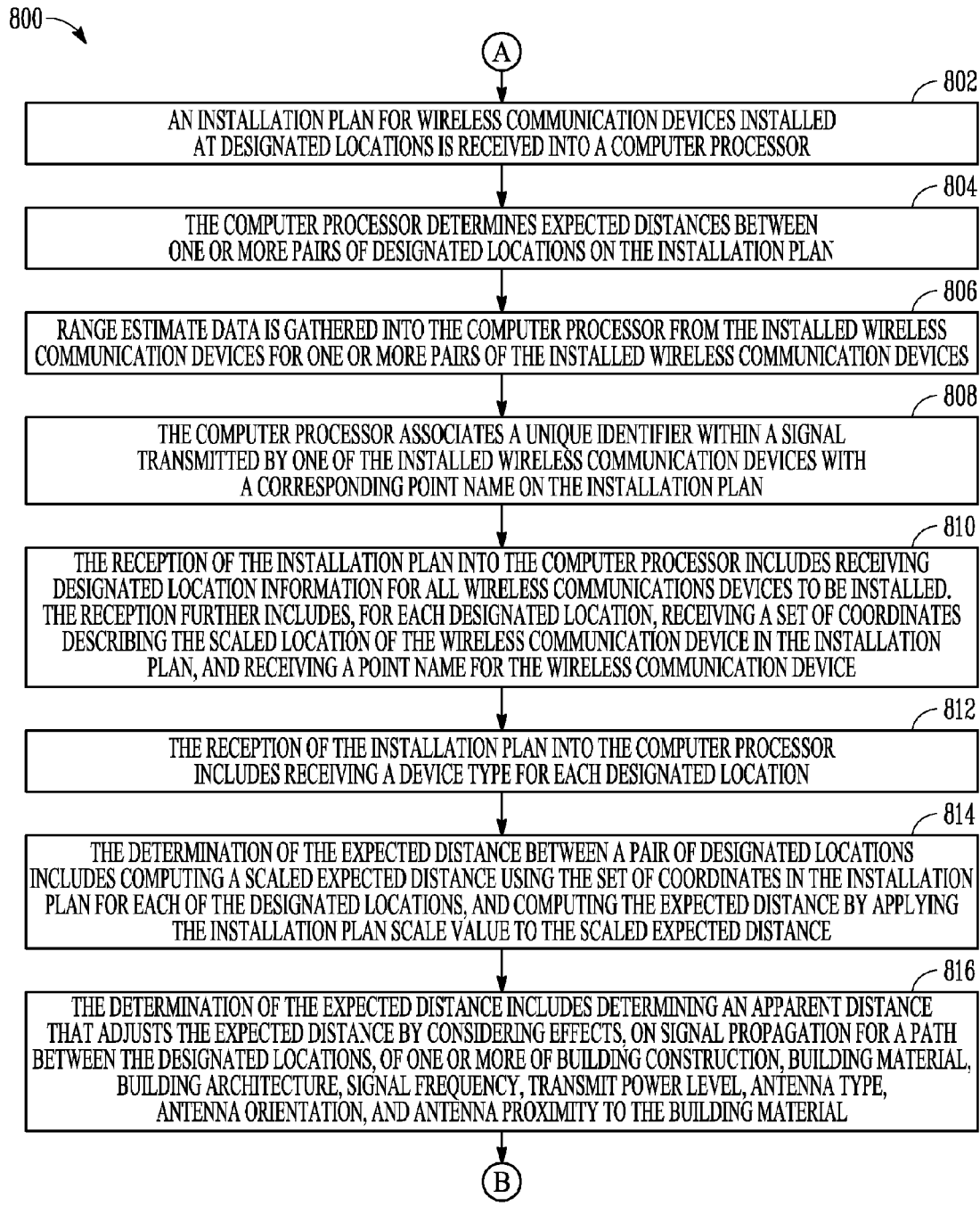
Figure 8C:
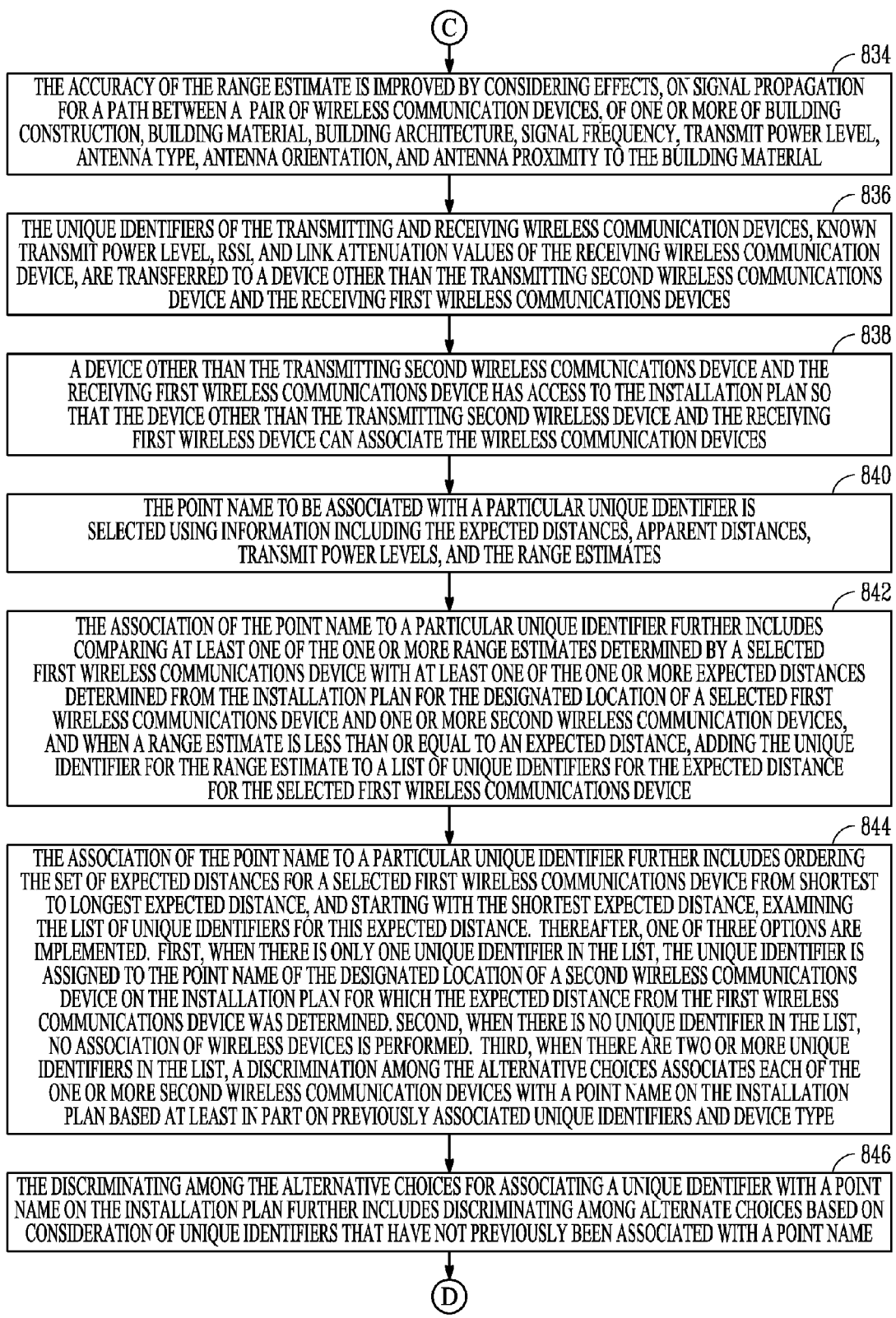
Figure 8D:
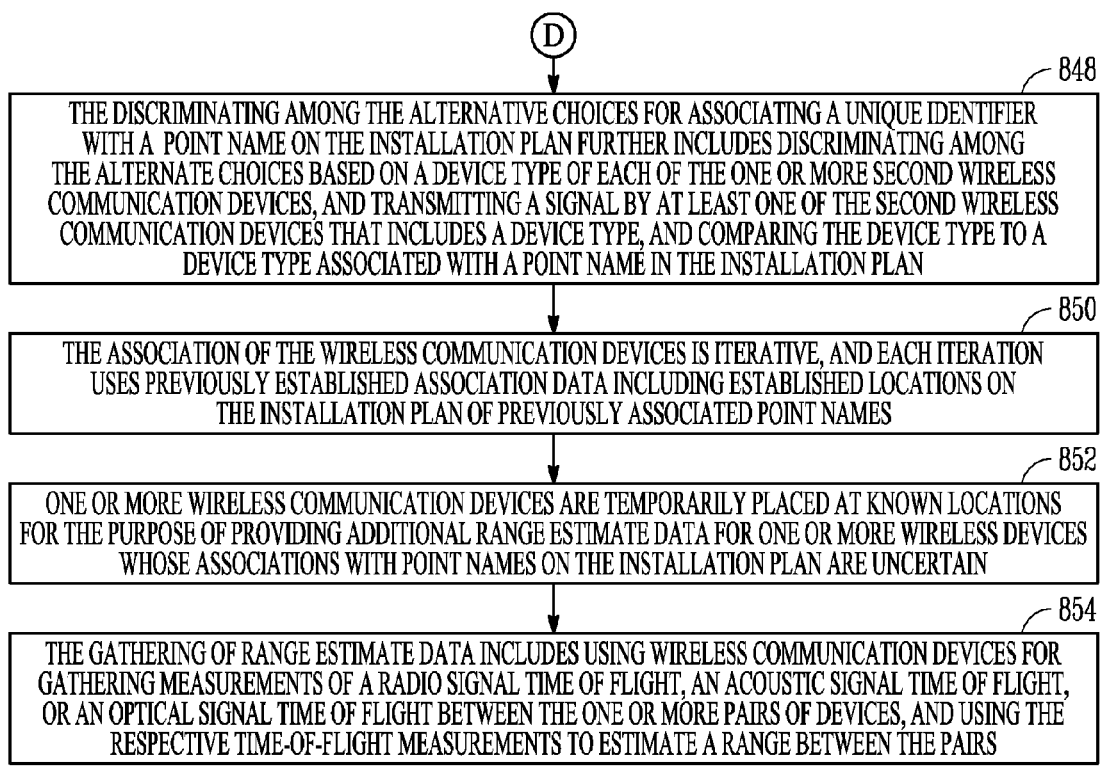

FIGS. 7A-7E illustrate the same concepts as FIGS. 6A-6E, but with a newly selected transmitting device. Specifically, FIG. 7A illustrates apparent distances 720-1, 720-2, 720-3, and 720-4 for several wireless communication devices 710, 712, 714, and 718, with device 716 serving as the transmitting device. FIG. 7B is a table of the apparent distances of FIG. 7A. Contrary to FIGS. 6A-6E, there will be a change in apparent distance for device 712 since device 716 has to transmit through a wall to reach device 712. However, there should be no change for device 718 since device 716 will not have to transmit through a wall or other obstacle to reach device 718. As like in FIG. 6D, the calculated range estimates of FIG. 7D, which are illustrated in FIG. 7C, position the devices 760, 762, 764, and 768 in their proper location. Once again, contrary to FIG. 6C, wherein device 668 was not associated, in FIG. 7C, device 768 is now associated. FIG. 7E is a table of designated locations of FIG. 7A and the responding locations of FIG. 7C, such that, for example, the apparent or designated location of device 714 (which was affected by the increased power transmit level required to penetrate the building walls) is actually found to be located at 764 as illustrated in FIG. 7C (per the gathering of the range estimate data).

Figure 9:
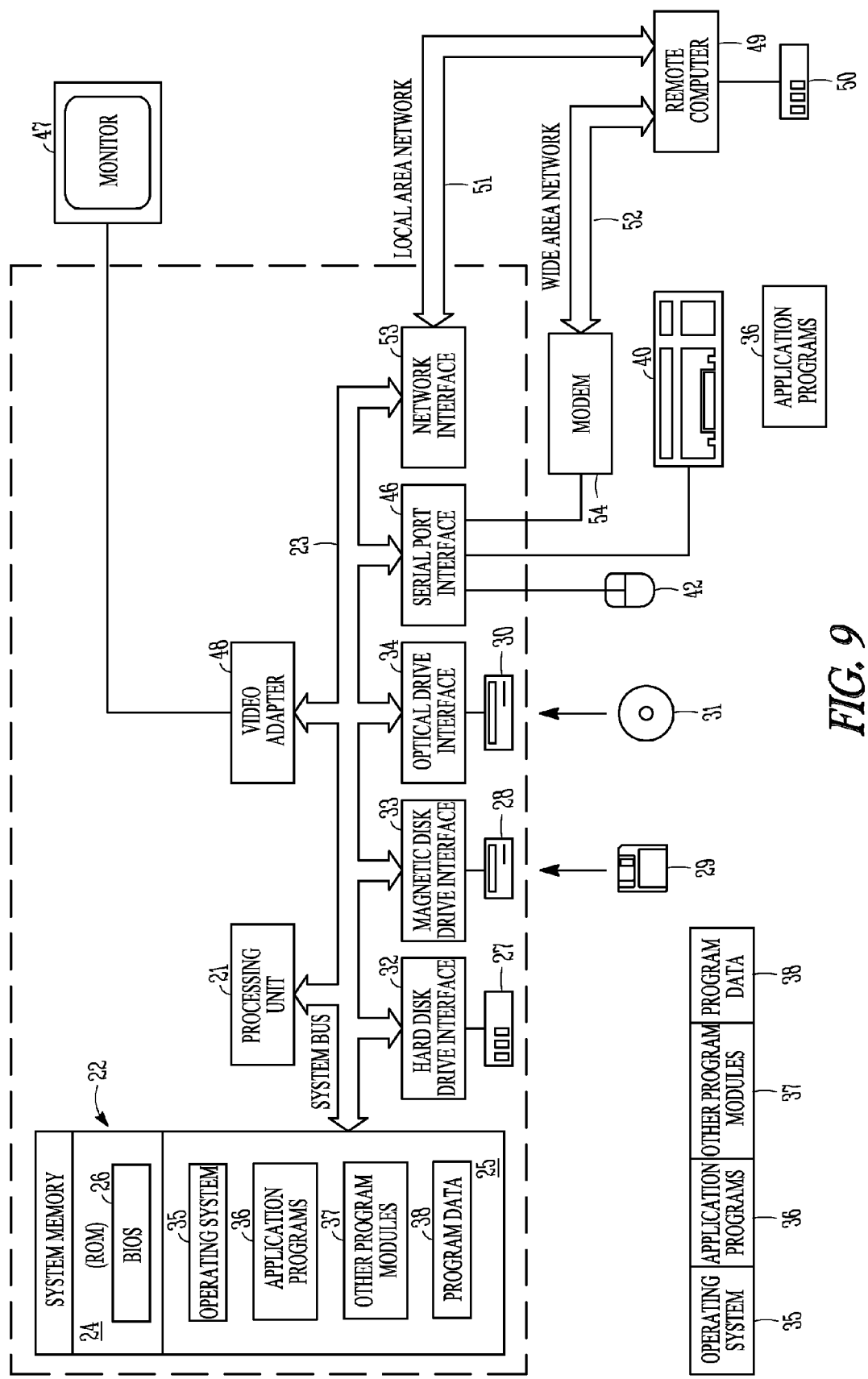
FIG. 9 is a block diagram of a computer system upon which one or more embodiments can operate.

FIG. 9 is an overview diagram of a hardware and operating environment in conjunction with which embodiments of the invention may be practiced. The description of FIG. 9 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above 110 relative to the computer 20, although only a memory storage device 50 has been illustrated. The logical connections depicted in FIG. 9 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for automatically associating wireless devices to point names has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A computerized method comprising:
receiving into a computer processor an installation plan for wireless communication devices installed at designated locations, wherein each designated location in the installation plan comprises an associated point name, wherein each wireless communication device is configured to transmit a message indicating itself as the source of the message, and wherein each wireless communication device is installed proximate to its designated location;
determining, using the computer processor, expected distances between one or more pairs of designated locations on the installation plan using a set of coordinates in the installation plan for the designated locations and applying installation plan scale values to the expected distances;
gathering range estimate data into the computer processor from the installed wireless communication devices for one or more pairs of the installed wireless communication devices; and
associating, using the computer processor, a unique identifier within a signal transmitted by one of the installed wireless communication devices with a corresponding point name on the installation plan, wherein the associating is determined at least in part by the expected distances and the range estimate data;
wherein determining the expected distance between a pair of designated locations comprises:
computing a scaled expected distance using the set of coordinates in the installation plan for each of the designated locations; and
computing the expected distance by applying the installation plan scale value to the scaled expected distance; and
wherein determining the expected distance further comprises:
determining an apparent distance that adjusts the expected distance by considering effects, on signal propagation for a path between the designated locations, of building construction, building material, building architecture, signal frequency, transmit power level, antenna type, antenna orientation, and antenna proximity to the building material.

2. The computerized method of claim 1, wherein receiving the installation plan into the computer processor comprises:
receiving designated location information for all wireless communications devices to be installed; and
for each designated location:
receiving a set of coordinates describing the scaled location of the wireless communication device in the installation plan; and
receiving a point name for the wireless communication device;
wherein each designated location comprises a set of coordinates, and wherein the coordinates represent a known distance scale.

3. The computerized method of claim 2, wherein receiving the installation plan into the computer processor comprises receiving a device type for each designated location.

4. The computerized method of claim 1, wherein the gathering range estimate data comprises:
selecting a first wireless communication device to transmit a first signal using a selected transmit power level;
transmitting the first signal;
switching the first wireless communication device to a receive mode;
receiving the transmitted signal at one or more second wireless communication devices;
transmitting a second signal from each of the one or more second wireless communication devices to the selected first wireless communication device;
receiving one or more of the second signals at the selected first wireless communication device;
estimating a range associated with the selected transmit power level at which one of the second wireless communication devices could receive the transmitted signal at the selected transmit power level from the selected first wireless communication device;
determining an upper and lower bound on a range between the first wireless communication device and one of the second wireless communication devices;
incorporating the upper and lower bound into the range estimate data;
generating a list of unique identifiers, associated with the selected transmit power level, comprising signals received by the first wireless communication device from the one or more second wireless communication devices.

5. The computerized method of claim 4, wherein the unique identifier of the first wireless communication device, selected transmit power level, and list of unique identifiers received by the selected first wireless communication device using the selected transmit power level, are transferred to a device other than the first wireless communication device; and
wherein the device other than the first wireless communication device has access to the installation plan.

6. The computerized method of claim 4, comprising:
initially setting the selected transmit power level to one of a lowest possible level, a highest possible level, or an intermediate level;
increasing the selected transmit power level to at least one level greater than a level necessary to receive a response from at least one of the second wireless communication devices or decreasing the selected transmit power level to at least one level lower than a level necessary to receive a response from at least one of the second wireless communication devices;
determining an upper and lower bound on a range between the first wireless communication device and one of the second wireless communication devices; and
incorporating the upper and lower bound into the range estimate data.

7. The computerized method of claim 1, wherein the gathering range estimate data comprises;

determining, by a first wireless communications device, link attenuation values based on a known transmit power level and a received signal strength indication (RSSI) derived from signals occasionally transmitted by the one or more second wireless communications devices; and
using the link attenuation values to determine a range estimate between a receiving first wireless communications device and a transmitting second wireless communications device.

8. The computerized method of claim 7, wherein the unique identifiers of the transmitting and receiving wireless communication devices, known transmit power level, RSSI, and link attenuation values of the receiving wireless communication device, are transferred to a device other than the transmitting second wireless communications device and the receiving first wireless communications devices; and
wherein a device other than the transmitting second wireless communications device and the receiving first wireless communications device has access to the installation plan.

9. The computerized method of claim 7, wherein determining the expected distance further comprises:
determining an apparent distance that adjusts the expected distance by considering effects, on signal propagation for a path between the designated locations, of one or more of building construction, building material, building architecture, signal frequency, transmit power level, antenna type, antenna orientation, and antenna proximity to the building material.

10. The computerized method of claim 1, wherein the association of the point name to a particular unique identifier further comprises:
selecting the point name to be associated with a particular unique identifier using information including the expected distances, apparent distances, transmit power levels, and range estimates; and
comparing at least one of the one or more range estimates determined by a selected first wireless communications device with at least one of the one or more expected distances determined from the installation plan for the designated location of a selected first wireless communications device and one or more second wireless communication devices;
when a range estimate is less than or equal to an expected distance, adding the unique identifier for the range estimate to a list of unique identifiers for the expected distance for the selected first wireless communications device.

11. The computerized method of claim 10, wherein the association of the point name to a particular unique identifier further comprises:
ordering the set of expected distances for a selected first wireless communications device from shortest to longest expected distance;
starting with the shortest expected distance, examining the list of unique identifiers for this expected distance;
when there is only one unique identifier in the list, assigning the unique identifier to the point name of the designated location of a second wireless communications device on the installation plan for which the expected distance from the first wireless communications device was determined;
when there is no unique identifier in the list, performing no associating; and
when there are two or more unique identifiers in the list, discriminating among alternative choices for associating each of the one or more second wireless communication devices with a point name on the installation plan based at least in part on previously associated unique identifiers and device type.

12. The computerized method of claim 11, wherein the discriminating among alternative choices for associating a unique identifier with a point name on the installation plan further comprises:
discriminating among alternate choices based on consideration of unique identifiers that have not previously been associated with a point name.

13. The computerized method of claim 12, wherein the discriminating among alternative choices for associating a unique identifier with a point name on the installation plan further comprises;
discriminating among alternate choices based on a device type of each of the one or more second wireless communication devices; and
transmitting a signal by at least one of the second wireless communication devices that comprises a device type, and comparing the device type to a device type associated with a point name in the installation plan.

14. The computerized method of claim 1, wherein the associating is iterative, and each iteration uses previously established association data including established locations on the installation plan of previously associated point names.

15. The computerized method of claim 1, comprising temporarily placing one or more wireless communication devices at known locations for a purpose of providing additional range estimate data for one or more wireless devices whose associations with point names on the installation plan are uncertain; wherein the computer processor has information about the designated location of the temporarily placed devices.

16. The computerized method of claim 1, wherein the gathering range estimate data comprises using wireless communication devices for gathering measurements of a radio signal time of flight, an acoustic signal time of flight, or an optical signal time of flight between the one or more pairs of devices and using the respective time-of-flight measurements to estimate a range between the pairs.

17. A system comprising:
two or more wireless communication devices installed proximate to designated locations, wherein the two or more wireless communication devices are configured to include in one or more wireless transmitted signals an identifier uniquely identifying the wireless communication device that transmitted the signal;
one or more computer processors configured for:
receiving an installation plan for the two or more wireless communication devices, wherein each designated location in the installation plan comprises an associated point name;
determining expected distances between pairs of designated locations in the installation plan;
gathering range estimate data from the installed wireless communication devices for one or more pairs of the installed wireless communication devices; and
associating a unique identifier with a corresponding point name on the installation plan, wherein the associating is determined at least in part by the expected distances and range estimate data;
wherein the gathering range estimate data comprises:
selecting a first wireless communication device to transmit a first signal using a selected transmit power level;
transmitting the first signal;
switching the first wireless communication device to a receive mode;

receiving the transmitted signal at one or more second wireless communication devices:
transmitting a second signal from each of the one or more second wireless communication devices to the selected first wireless communication device;
receiving one or more of the second signals at the selected first wireless communication device;
estimating a range associated with the selected transmit power level at which one of the second wireless communication devices could receive the transmitted signal at the selected transmit power level from the selected first wireless communication device;
determining an upper and lower bound on a range between the first wireless communication device and one of the second wireless communication devices;
incorporating the upper and lower bound into the range estimate data;
generating a list of unique identifiers, associated with the selected transmit power level, comprising signals received by the first wireless communication device from the one or more second wireless communication devices; and comprising:
initially setting the selected transmit power level to one of a lowest possible level, a highest possible level, or an intermediate level;
increasing the selected transmit power level to at least one level greater than a level necessary to receive a response from at least one of the second wireless communication devices or decreasing the selected transmit power level to at least one level lower than a level necessary to receive a response from at least one of the second wireless communication devices;
determining an upper and lower bound on a range between the first wireless communication device and one of the second wireless communication devices; and
incorporating the upper and lower bound into the range estimate data.

18. A computerized method comprising:
receiving into a computer processor an installation plan for wireless communication devices installed at designated locations, wherein each designated location in the installation plan comprises an associated point name, wherein each wireless communication device is configured to transmit a message indicating itself as the source of the message, and wherein each wireless communication device is installed proximate to its designated location; and
determining, using the computer processor, expected distances between one or more pairs of designated locations on the installation plan using a set of coordinates in the installation plan for the designated locations and applying installation plan scale values to the expected distances;
gathering range estimate data into the computer processor from the installed wireless communication devices for one or more pairs of the installed wireless communication devices; and
associating, using the computer processor, a unique identifier within a signal transmitted by one of the installed wireless communication devices with a corresponding point name on the installation plan, wherein the associating is determined at least in part by the expected distances and the range estimate data;
wherein the gathering range estimate data comprises:
selecting a first wireless communication device to transmit a first signal using a selected transmit power level;
transmitting the first signal;
switching the first wireless communication device to a receive mode;
receiving the transmitted signal at one or more second wireless communication devices;
transmitting a second signal from each of the one or more second wireless communication devices to the selected first wireless communication device;
receiving one or more of the second signals at the selected first wireless communication device;
estimating a range associated with the selected transmit power level at which one of the second wireless communication devices could receive the transmitted signal at the selected transmit power level from the selected first wireless communication device;
determining an upper and lower bound on a range between the first wireless communication device and one of the second wireless communication devices;
incorporating the upper and lower bound into the range estimate data;
generating a list of unique identifiers, associated with the selected transmit power level, comprising signals received by the first wireless communication device from the one or more second wireless communication devices; and comprising:
initially setting the selected transmit power level to one of a lowest possible level, a highest possible level, or an intermediate level;
increasing the selected transmit power level to at least one level greater than a level necessary to receive a response from at least one of the second wireless communication devices or decreasing the selected transmit power level to at least one level lower than a level necessary to receive a response from at least one of the second wireless communication devices;
determining an upper and lower bound on a range between the first wireless communication device and one of the second wireless communication devices; and
incorporating the upper and lower bound into the range estimate data.

* * * * *